(12) United States Patent
Raaijmakers (10) Patent No.: US 11,837,952 B2
(45) Date of Patent: Dec. 5, 2023

(54) THREE-PHASE AC TO DC POWER CONVERTER

(71) Applicant: ABB SCHWEIZ AG, Baden (CH)

(72) Inventor: Stefan Raaijmakers, Delft (NL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/491,544

(22) Filed: Oct. 1, 2021

(65) Prior Publication Data

US 2022/0021294 A1 Jan. 20, 2022

Related U.S. Application Data

(63) Continuation of application No. PCT/EP2020/057180, filed on Mar. 17, 2020.

(30) Foreign Application Priority Data

Apr. 2, 2019 (EP) ..................................... 19166837

(51) Int. Cl.
*H02M 1/42* (2007.01)
*B60L 53/22* (2019.01)
(Continued)

(52) U.S. Cl.
CPC ........... *H02M 1/4216* (2013.01); *B60L 53/22* (2019.02); *H02M 1/007* (2021.05); *H02M 1/348* (2021.05);
(Continued)

(58) Field of Classification Search
CPC ........ H02M 1/12; H02M 1/42; H02M 1/4216; H02M 1/4225; H02M 1/4258;
(Continued)

(56) References Cited

U.S. PATENT DOCUMENTS 5,442,539 A 8/1995 Cuk et al.
5,539,630 A 7/1996 Pietkiewicz et al.
(Continued)

FOREIGN PATENT DOCUMENTS

CN 102064712 A 5/2011
CN 104967304 A 10/2015
(Continued)

OTHER PUBLICATIONS

Abdel-Rahman, "Chapter 6: Soft-Switching dc-dc Converters Outlines," Univ. Lecture, *EEL6246 Power Electronics II*, 13 pp.
(Continued)

*Primary Examiner* — Gary L Laxton
(74) *Attorney, Agent, or Firm* — Leydig, Voit & Mayer, Ltd.

(57) ABSTRACT

A three-phase alternating current (AC) to direct current (DC) power converter includes a boost power factor correction (PFC) circuit that includes a low frequency diode-based converter, and a PFC inductor and a PFC capacitor connected in series together and in parallel to a PFC output of the converter. The boost PFC circuit further includes either a high frequency PFC diode and a high frequency PFC switch or a plurality of high frequency PFC switches. A Ćuk converter includes a first Ćuk inductor and a Ćuk capacitor, a second Ćuk inductor and a high frequency Ćuk diode, and a transformer having a primary side connected in parallel to the PFC capacitor and a secondary side connected in parallel to the Ćuk capacitor.

11 Claims, 5 Drawing Sheets

(51) Int. Cl.
  H02M 1/00    (2006.01)
  H02M 1/34    (2007.01)
  H02M 3/00    (2006.01)
  H02M 1/12    (2006.01)
(52) U.S. Cl.
  CPC ....... H02M 1/4225 (2013.01); H02M 1/4258 (2013.01); H02M 3/005 (2013.01); *H02M 1/12* (2013.01)
(58) Field of Classification Search
  CPC ...... H02M 1/007; H02M 1/348; H02M 3/005; B60L 53/22; B60L 2210/30
  See application file for complete search history.

(56) References Cited

U.S. PATENT DOCUMENTS

| 2010/0165669 | A1 | 7/2010 | Li |
| 2012/0120697 | A1 | 5/2012 | Cuk |
| 2016/0256950 | A1* | 9/2016 | Madsen ................ B23K 9/095 |
| 2020/0091753 | A1* | 3/2020 | Maruyama ............ H02M 7/217 |
| 2022/0021293 | A1* | 1/2022 | Esmoris Bertoa ...... H02M 1/10 |

FOREIGN PATENT DOCUMENTS

| CN | 105871244 A | 8/2016 |
| EP | 2479059 A1 | 7/2012 |
| EP | 2479879 A1 | 7/2012 |
| EP | 2720357 A2 | 4/2014 |
| WO | 2018/029435 A1 | 2/2018 |

OTHER PUBLICATIONS

Ayyanar et al., "Soft-Switching in DC-DC Converters: Principles, Practical Topologies, Design Techniques, Latest Developments," *17th Annual IEEE Applied Power Electronics Conference and Exposition (APEC)*, 31 pp. (Mar. 10-14, 2002).
Chattopadhyay et al., "A New Family of Active Clamp PWM DC-DC Converters with ZVS for Main Switch and ZCS for Auxiliary Switch," *2011 Twenty-Sixth Annual IEEE Applied Power Electronics Conference and Exposition (APEC)*, 851-858 (Mar. 6-11, 2011).
Jain, "A Zero Voltage Switching Boost Converter Using a Soft Switching Auxiliary Circuit with Reduced Conduction Losses," PhD dissertation, *Concordia University*, 139 pp. (Dec. 2000).
Karatzaferis et al., "Comparison and Evaluation of Power Factor Correction Topologies for Industrial Applications," *Energy and Power Engineering*, 5(6): 401-410 (Jul. 21, 2013).
Kiran, "Simulation of ZVS Cuk Converter Using PSIM," *International J. of Research in Electrical Engineering (IJREE)*, 4(1): 25-27 (Jan. 2017).
Kushnerov, "Cuk Converter in DCM as Power Factor Corrector," Dissertation, *Ben-Gurion University of the Negev*, 30 pp. (2006).
Kushwaha et al., "A Unity Power Factor Converter with Isolation for Electric Vehicle Battery Charger," *IEEMA Engineer Infinite Conference (eTechNxT)*, 6 pp. (Mar. 13, 2018).
Lin et al., "Zero voltage switching active clamp buck-boost stage Cuk converter," *IET Electric Power Applications*, 1(2): 173-182 (Mar. 2007).
Panda et al., "Study of Soft Switching Boost Converter Using an Auxiliary Resonant Circuit," PhD dissertation, *National Institute of Technology Rourkela*, 62 pp. (May 2012).
Pomilio et al., "High-Precision Current Source Using Low-Loss, Single-Switch, Three-Phase AC/DC Converter," *IEEE Transactions on Power Electronics*, 11(4): 561-566 (Jul. 1996).
Power Electronics, "Zero Voltage Switching Quasi-resonant Converters," *The Hong Kong Polytechnic Univ. (PolyU)*, 17 pp.
Ruiz-Caballero et al., "A New ZVS-PWM Clamping Mode Isolated Non Pulsating Input and Output Current DC-to-DC Converter," *International Telecommunications Energy Conference (INTELEC)*, 99: 6 pp. (Jun. 9, 1999).
Sasikala et al., "Comparison of bridgeless CUK converter for power factor correction in led using soft switching technique," *J. of Chemical and Pharmaceutical Sciences (JCHPS)*, 10: 56-60 (Jul. 2015).
Singh et al., "Comprehensive Study of Single-Phase AC-DC Power Factor Corrected Converters with High-Frequency Isolation," *IEEE Transactions on Industrial Informatics*, 7(4): 540-556 (Nov. 2011).
Smith et al., "A Comparison of Voltage-Mode Soft-Switching Methods for PWM Converters," *IEEE Transactions on Power Electronics*, 12(2): 10 pp. (Mar. 1997).
Smith et al., "Lossless, Passive Soft Switching Methods for Inverters and Amplifiers," *Record 28th Annual IEEE Power Electronics Specialists Conference (PESC97)*, 2: 9 pp. (Jun. 27, 1997).
Smith et al., "Properties and Synthesis of Passive, Lossless Soft-Switching PWM Converters," *1st International Congress in Israel on Energy Power & Motion Control (EPMC)*, 9 pp. (1997).
Spiazzi et al., "Design Optimization of Soft-Switched Insulated DC/DC Converters With Active Voltage Clamp," *IAS'96, Conference Record of the 1996 IEEE Industry Applications Conference Thirty-First IAS Annual Meeting*, 8 pp. (Oct. 6-10, 1996).
Vaigundamoorthi, "Design and Analysis of DC-DC Converter for Solar PV System," PhD dissertation, *Anna University*, 180 pp. (Oct. 2013).
Wijeratne, "Three-Phase Reduced Switch Topologies for AC-DC Front-End and Single-Stage Converters," PhD dissertation, *Electronic Thesis and Dissertation Repository, The University of Western Ontario*, 186 pp. (Jul. 11, 2013).
European Patent Office, International Search Report in International Patent Application No. PCT/EP2020/057180, 4 pp. (dated Jun. 12, 2020).
European Patent Office, Written Opinion in International Patent Application No. PCT/EP2020/057180, 6 pp. (dated Jun. 12, 2020).
European Patent Office, Extended European Search Report in European Patent Application No. 19166837.5, 9 pp. (dated Nov. 8, 2019).
Deng et al., "Study of a three-phase power factor correction based on a single zero-current switching Cuk converter," *Proceedings of the Chinese Society of Electrical Engineering (CSEE)*, 24(4): 74-79 (Apr. 17, 2004).
China National Intellectual Property Administration, Office Action in Chinese Patent Application No. 202080026073.1, 13 pp. (dated Aug. 2, 2023).

\* cited by examiner

THREE-PHASE AC TO DC POWER CONVERTER

CROSS-REFERENCE TO PRIOR APPLICATION

This application is a continuation of International Patent Application No. PCT/EP2020/057180, filed on Mar. 17, 2020, which claims priority to European Patent Application No. EP 19166837.5, filed on Apr. 2, 2019. The entire disclosure of both applications is hereby incorporated by reference herein.

FIELD

One or more embodiments of the invention may relate to a three-phase alternating current, AC, to direct current, DC, power converter in particular for charging an electrical vehicle, comprising a low frequency diode-based converter.

BACKGROUND

Power converters for charging electrical vehicles are known from prior art and are often referred to as electric vehicle charging station, also called EV charging station, electric recharging point, charging point, charge point, ECS, electronic charging station, or in recent days as EVSE, electric vehicle supply equipment. Generally, an EVSE is an element in an infrastructure that supplies electric energy for the recharging of electric vehicles, such as plug-in electric vehicles, including electric cars, neighbourhood electric vehicles and plug-in hybrids, either at home, at public spaces or work. Some electric vehicles have on board converters that can plug into a standard electrical outlet or a high-capacity appliance outlet. Other electrical vehicles either require or can use a charging station that provides electrical conversion, monitoring, or safety functionality.

These charging stations are also needed when traveling, and many support faster charging at higher voltages and currents than are available from residential EVSEs. Public charging stations are typically on-street facilities provided by electric utility companies or located at retail shopping centers, restaurants and parkings, and operated by many private companies. Charging standards encompass Combined Charging System, CCS, which is becoming the universal standard or CHAdeMO besides others.

There is general aim to constantly provide better power converter topologies that are cheap, provide a large output voltage range, are characterized by a high efficient power conversion, a good power factor, THD, total harmonic distortion, on alternating current, AC and/or a good output ripple on direct current, DC.

SUMMARY

In one or more embodiments, the present invention may provide a three-phase alternating current (AC) to direct current (DC) power converter that may include:
a boost power factor correction (PFC) circuit that may include:
a low frequency diode-based converter configured for connecting a PFC input of the low frequency diode-based converter to an AC source; and
a PFC inductor and a PFC capacitor connected in series together and in parallel to a PFC output of the converter;
the boost PFC circuit further comprising either:
a high frequency PFC diode and a high frequency PFC switch connected in parallel to the PFC output of the converter; or
a plurality of high frequency PFC switches, each high frequency PFC switch connected in parallel to one of the diodes of the low frequency diode-based converter;
a Ćuk converter that may include:
a first Ćuk inductor and a Ćuk capacitor connected in series;
a second Ćuk inductor and a high frequency Ćuk diode connected in parallel to the series connection and forming, via a series connection with the second Ćuk inductor, a Ćuk output that is configured to connect to a DC load; and a transformer that may include:
a primary side connected in parallel to the PFC capacitor; and
a secondary side connected in parallel to the Ćuk capacitor.

An object of the present invention may be to provide an improved power converter for charging an electrical vehicle.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

An object of the invention may be solved by the features of the independent claims. Preferred embodiments may be detailed in the dependent claims.

Thus, the object is solved by a three-phase alternating current, AC, to direct current, DC, power converter in particular for charging an electrical vehicle, comprising
a boost power factor correction, PFC, circuit comprising
a low frequency diode-based converter configured for connecting a PFC input of the converter to an AC source, and a PFC inductor and a PFC capacitor connected in series together and in parallel to a PFC output of the converter, further comprising either a high frequency PFC diode and a high frequency PFC switch connected in parallel to the PFC output of the converter or comprising a plurality of high frequency PFC switches each connected in parallel to one of the diodes of the converter, a Ćuk converter comprising a Ćuk inductor and a first Ćuk capacitor connected in series, a second Ćuk capacitor and a high frequency Ćuk diode connected in parallel to the series connection and forming, via a series connection with the second Ćuk capacitor, a Ćuk output in particular to which the electrical vehicle can be connected as DC load, and a transformer having a primary side connected in parallel to the PFC capacitor and a secondary side connected in parallel to the Ćuk capacitor.

An aspect of one or more embodiments of the present invention may be to combine a three phase boost PFC circuit with a Ćuk converter. A power factor correction, PFC circuit generally increases the power factor of a load thereby improving overall conversion efficiency. The power factor of an AC electrical power system is defined as the ratio of the real power absorbed by the load to the apparent power flowing in the circuit, and is a dimensionless number in the closed interval of −1 to 1. A Ćuk converter, sometimes incorrectly spelled Cuk, Ćuk or Ćuk, is a type of DC/DC converter that has an output voltage magnitude that is either greater than or less than the input voltage magnitude. The Ćuk converter is essentially a boost converter followed by a buck converter with a capacitor i.e. the first Ćuk capacitor to couple the energy. The Ćuk converter is named after Slobodan Ćuk of the California Institute of Technology, who first presented the design. The Ćuk converter is preferably provided as an isolated Ćuk converter. Switching frequency for the switches is for example 10 kHz.

The proposed converter provides the advantage of a constant input current and constant output current, with inductor current ripple. Even that hard switching may be applied to the switch, the proposed solution helps to improve EMC, electromagnetic compatibility, and input/output ripple requirements. The proposed converter advantageously provides a wide range of output voltages. Possible inductors on the AC side see three levels, thereby reducing the input voltage ripple. Due to using the Ćuk respectively boost-buck converter, a wide output voltage range independent of the input voltage can be achieved. Thus, power conversion efficiency is very high as there is no input rectification or output rectification. The proposed solution is particularly suited for SiC, silicon carbide, and IGBTs as switches and can be implemented by using only one "high" frequency switch and each one "high" frequency diode on the primary and on the secondary side. Thus, as component count is in addition very low, the proposed converter can be implemented at very low cost but thereby providing high efficiency in conversion.

In case the high frequency PFC diode and the high frequency PFC switch are connected in parallel to the PFC output of the converter the power path only requires one high frequency PFC switch, one high frequency PFC diode, one high frequency Ćuk diode, six low frequency diodes of the diode-based converter, mains frequency, four inductors, PFC and Ćuk, as well as two capacitors, PFC and Ćuk. The prosed topology does not need any AC voltage or current measurement while only output voltage and current would be sufficient. Control of the switching can very easily done, as it is naturally stable, works with a fixed PWM, pulse width modulation, or slight corrections in case of unclean AC sources. For such 'single' switch version the PFC inductor can be used in discontinuous mode resulting in a good power factor.

In case the plurality of high frequency PFC switches are each connected in parallel to one of the diodes of the converter such solution either provides a good power factor, while it can be uni- or bi directional, with the addition of one extra Ćuk switch, as described later. In such case the diodes of the converter are preferably provided as high frequency diodes as well. The term high frequency means in terms of the present application that, for example for a switch, the switch provide faster switching frequency than of overall system frequency, for example of the AC network. In such topology a single high frequency PFC switch can be overtaken by the plurality of high frequency PFC switches using some smart switching strategies. In other words, the single high frequency PFC switch is replaced by switching on all the plurality of high frequency PFC switches on the AC side of the diode-based converter. Any remaining duty cycle can be used to perform the PFC function on the AC side by switching the corresponding top and bottom high frequency PFC switches. Depending on the direction of the current, after all high frequency PFC switches are on, preferably the top or bottom high frequency PFC switches can be left on, and switched over in between, after which all high frequency PFC switches are switched on again. Such switching results in a good PFC on the AC side and constant current on the DC side. Besides that soft-switching techniques that have been used before in Ćuk and boost PFC converters can be applied to the proposed topologies. With such version with six high frequency PFC switches on the primary and a high frequency Ćuk switch switch on the secondary side, as discussed later, the converter can work bi-directionally.

The following implementations allow for further improving PFC and/or THD, total harmonic distortion, by using additional passive trap filter elements and/or passive PFC, additional parallel active harmonic compensation/PFC and/or harmonic compensation by replacing low frequency diodes with active switches. First two options are in particular advantageous depending on the power level and requirements. The latter option uses same power inductors. Therefore, extra costs only occur due to switches and their drivers compared to an additional active filter which would require extra inductors and a capacitor buffer.

According to a further preferred implementation the PFC capacitor, via the transformer, and the Ćuk capacitor are connected to the negative potential of the Ćuk output and the PFC inductor is connected, via the transformer, the first Ćuk inductor and the second Ćuk inductor, to the positive potential of the Ćuk output.

In another preferred implementation the anode of the high frequency Ćuk diode is connected to the negative potential of the Ćuk output.

According to a further preferred implementation the second Ćuk inductor is connected to the positive potential of the Ćuk output and in series with the first Ćuk inductor.

According to a further preferred implementation the converter comprises a high frequency Ćuk switch connected in parallel to the high frequency Ćuk diode.

According to another preferred implementation the converter comprises three phase inductors each arranged in a respective current path between the PFC input and the low frequency diode-based converter.

According to a further preferred implementation the converter comprises three trap capacitors and each trap inductors, the trap inductors connected together and in series with each one trap capacitors, whereby each one trap capacitor is connected to a respective phase inductor and the low frequency diode-based converter.

According to another preferred implementation the converter comprises three phase capacitors connected to together and to a respective phase of the PFC input. Such embodiments are in particular advantageous for reducing fifth and seventh harmonics, in particular by providing such trap filter thereby improving THD, total harmonic distortion, significantly. THD is a measurement of the harmonic distortion present in a signal and normally defined as the ratio of the sum of the powers of all harmonic components to the power of the fundamental frequency.

According to a further preferred implementation the converter comprises the high frequency PFC diode and the high frequency PFC switch connected in parallel to the PFC output of the converter, further comprising a second high frequency PFC diode and a second high frequency PFC switch connected in parallel, whereby each the PFC diodes the PFC switches are connected in parallel to the PFC output of the converter. Such embodiment allows for lower voltage rating switches and multi-level switching thereby reducing input and output ripple and/inductance values.

According to another preferred implementation the converter comprises the plurality of high frequency PFC switches each connected in parallel to one of the diodes of the converter, further comprising a second high frequency PFC switch connected in parallel to the PFC inductor.

According to a further preferred implementation the converter comprises the plurality of high frequency PFC switches each connected in parallel to one of the diodes of the converter, further comprising a high frequency Ćuk switch connected in parallel to the high frequency Ćuk diode, a second frequency Ćuk switch and a second high frequency Ćuk diode connected in parallel to the second high frequency Ćuk switch, whereby each the high frequency Ćuk diodes the high frequency Ćuk switches are connected in parallel to the series connection of the first Ćuk inductor and the Ćuk capacitor. As before, such embodiment allows as well for lower voltage rating switches and multi-level switching thereby reducing input and output ripple and/inductance values.

Further embodiments and advantages of the method are directly and unambiguously derived by the person skilled in the art from the system as described before.

Figure 1:
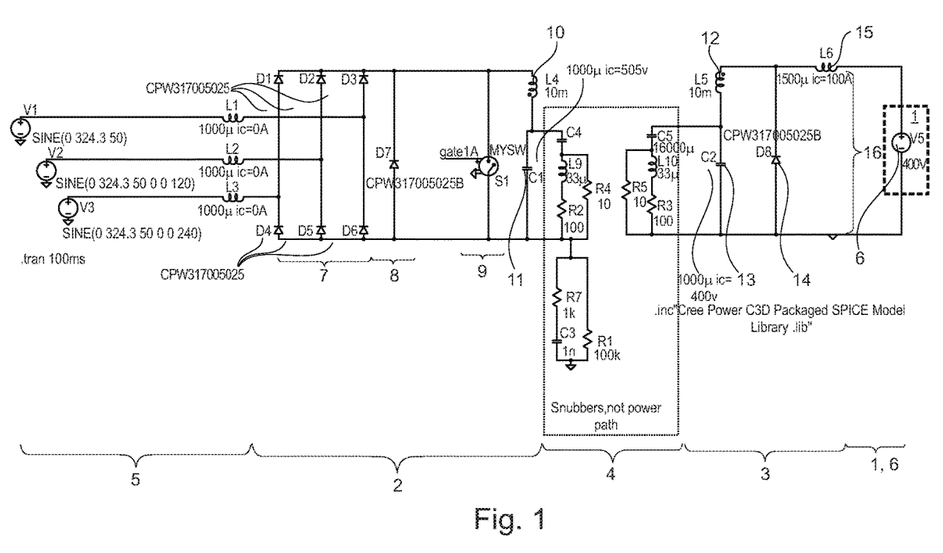
FIG. 1 shows in a schematic drawing a three-phase alternating current, AC, to direct current, DC, power converter according to a preferred embodiment of the invention.

FIG. 1 shows in a schematic drawing a three-phase alternating current, AC, to direct current, DC, power converter for charging an electrical vehicle 1 according to a preferred embodiment.

The converter comprises a boost power factor correction, PFC, circuit 2, a Ćuk converter 3 and a transformer 4. The PFC circuit 2 is on one side connected to an AC source 5, such as an AC grid. On the other side the PFC circuit 2 is connected to the transformer 4, which is then connected to the Ćuk converter 3, to which the electrical vehicle 1 is connected as DC load 6.

The three phase PFC circuit 2 comprises a low frequency diode-based converter 7, a high frequency PFC diode 8, a high frequency PFC switch 9, a PFC inductor 10 and a PFC capacitor 11. The high frequency PFC diode 8 and the high frequency PFC switch 9, which is provided as a voltage controlled FET switch, are arranged in parallel and thereby connected in parallel to an output of the diode-based converter 7 such that the anodes as well as the cathodes of the diodes of the diode-based converter 7 and of the high frequency PFC diode 8 are respectively connected together. The PFC inductor 10 has an inductance of 10 mH and the PFC capacitor 11 has a capacitance of 1000 µf are connected in series such that the PFC inductor 10 is connected to the cathodes and the PFC capacitor 11 is connected to the anodes.

Figure 2:
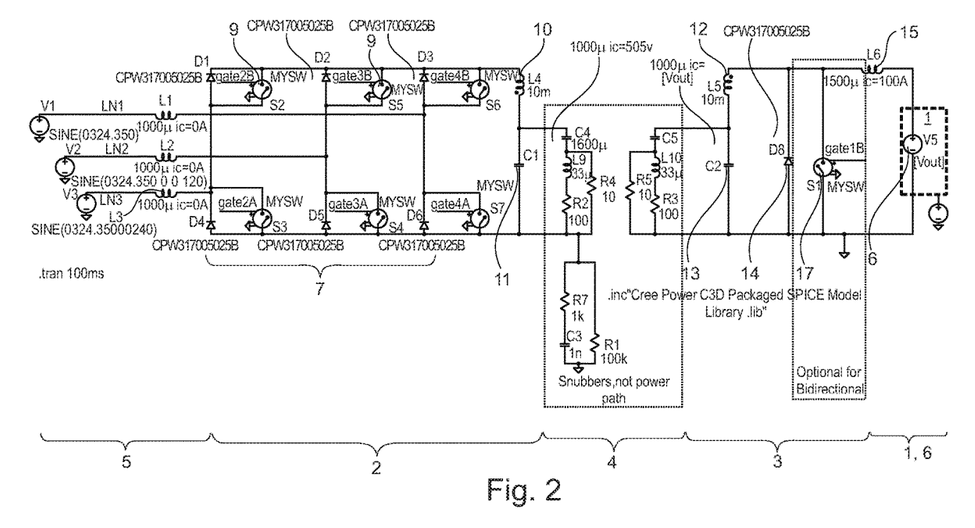
FIG. 2 shows in a schematic drawing a three-phase alternating current, AC, to direct current, DC, power converter according to another preferred embodiment of the invention.

FIG. 2 shows a further preferred embodiment, wherein, opposite to FIG. 1, the high frequency PFC diode 8 and the high frequency PFC switch 9 are not connected in parallel to the output of the diode-based converter 7. Instead, each one high frequency PFC switch 9 is connected in parallel to each diode of the diode-based converter 7.

The Ćuk converter 3 comprises a first Ćuk inductor 12 and a Ćuk capacitor 13, which are connected in series. The first Ćuk inductor 12 has an inductance of 10 mH and the Ćuk capacitor 13 has a capacitance of 1000 µf. The Ćuk converter 12 further comprises a high frequency Ćuk diode 14, which is connected in parallel to the series connection of the first Ćuk inductor 12 and the Ćuk capacitor 13. The anode of the high frequency Ćuk diode 14 is connected, via the transformer 4, to the anode of the high frequency PFC diode 8.

The Ćuk converter 3 further comprises a second Ćuk inductor 15 having an inductance of 1000 µH, which is connected to the cathode of the high frequency Ćuk diode 14. Such way the second Ćuk inductor 15 and the anode of the high frequency Ćuk diode 14 form a Ćuk output 16, to which the electrical vehicle 1 is connected as DC load 6. Further, the anode of the high frequency Ćuk diode 13 is connected to the negative potential of the Ćuk output 16. The further embodiment of FIG. 2 shows a high frequency Ćuk switch 17, which is connected in parallel to the high frequency Ćuk diode 14.

The transformer 4 is connected with its primary side in parallel to the PFC capacitor 11 and with its secondary side in parallel to the Ćuk capacitor 13, thereby connecting the PFC circuit 2 and the Ćuk converter 3. Such way the Ćuk capacitor 13 and the PFC capacitor 11 are connected, via the transformer 4, to the negative potential of the Ćuk output 16. The PFC inductor 10 is connected, via the transformer 4 and the first Ćuk inductor 11 and the second Ćuk inductor 15 to the positive potential of the Ćuk output 16.

Figure 3:
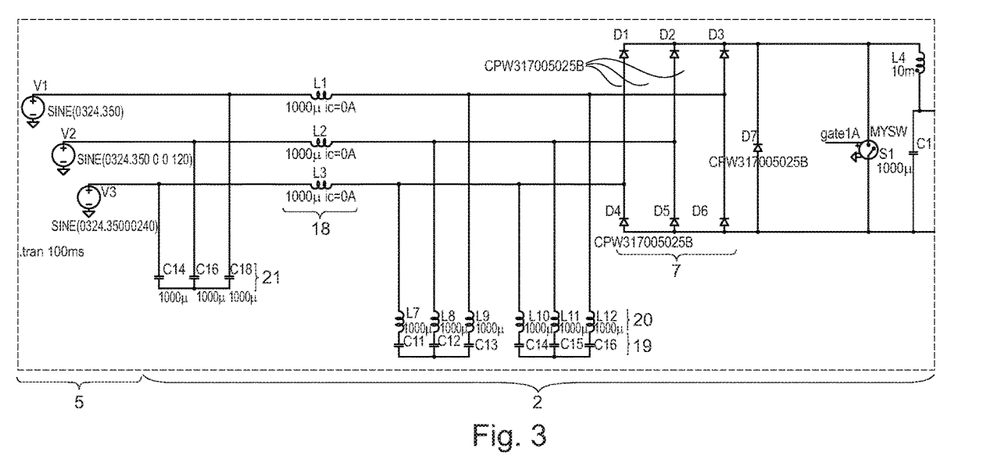
FIG. 3 shows in a schematic drawing a partial view of the power converter according to FIG. 1 in another preferred embodiment of the invention.

FIG. 3 shows an enlarged respectively partial view of the PFC circuit 2 according to a further preferred embodiment. Phase inductors 18 having each an inductance of 1000 µH are provided in each current path between the AC source 5 and the diode-based converter 7. Further, a trap filter is provided comprising two sets of each three trap capacitors 19 having each a capacitance of 1000 µF and three respective trap inductors 20 having each an inductance of 1000 µH. Each three trap inductors 20 are connected star-like together and in series with each one trap capacitors 19 to one phase between the phase inductors 18 and the converter 7. Furthermore, three phase capacitors 21 are provided each having a capacitance of 1000 µf. The phase capacitors 21 are connected star-like together and each to one phase between the phase inductors 18 and the AC source 7.

Figure 4:
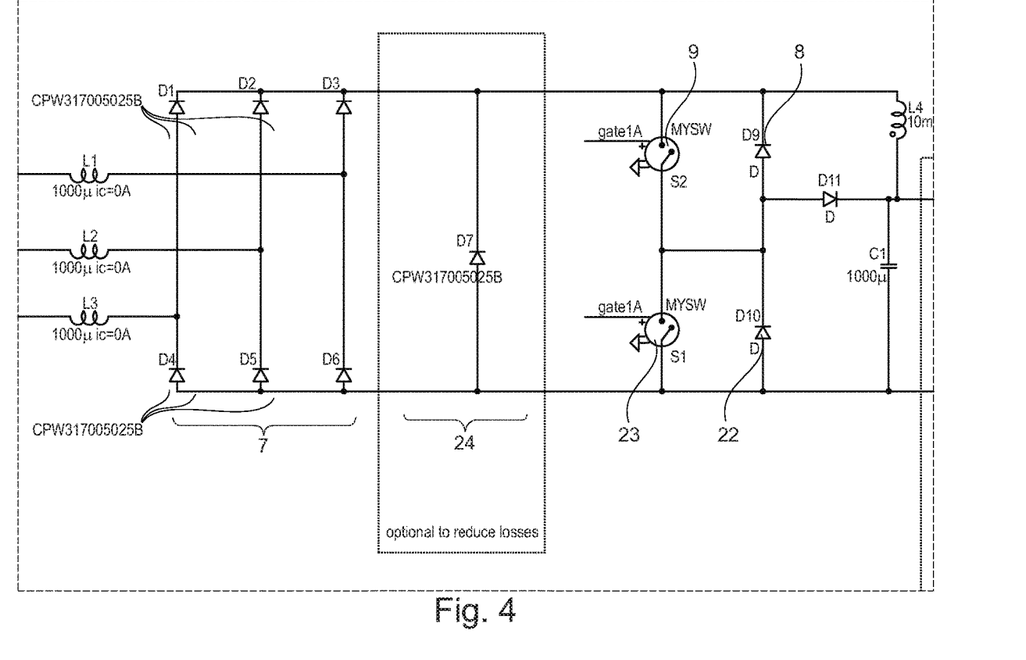
FIG. 4 shows in a schematic drawing a partial view of the power converter according to FIG. 1 in even another preferred embodiment of the invention.
Figure 5:
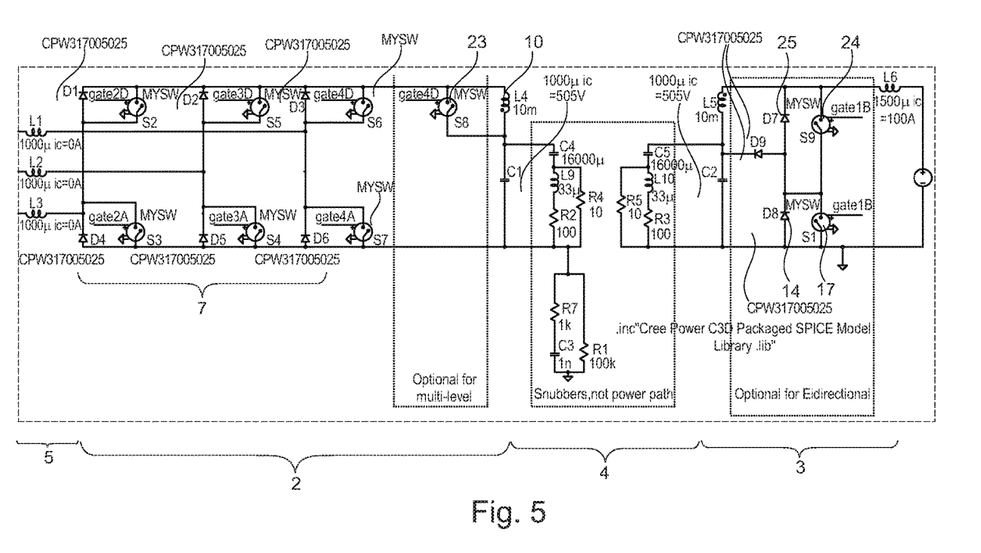
FIG. 5 shows in a schematic drawing a partial view of the power converter according to FIG. 2 in another preferred embodiment of the invention.

FIG. 4 shows a further embodiment of the PFC circuit 2, whereby a second high frequency PFC diode 22 and a second high frequency PFC switch 23 are provided. The high frequency PFC diode 8 and the second high frequency PFC diode 22 are connected in series and such wise in parallel to the output of the converter 7. The high frequency PFC switch 9 and the second high frequency PFC switch 23 are also connected in series and such wise in parallel to the output of the converter 7. Besides that said switches 9, 23 and diodes 8, 22 are star-like interconnected. A further high frequency PFC diode 24 is provided for receding losses In FIG. 5 another embodiment is depicted, wherein each one high frequency PFC switch 9 is connected in parallel to one of the diodes of the converter 7. Further, the second high frequency PFC switch 23 is connected in parallel to the PFC inductor 10. The Ćuk converter 3 comprises a second high frequency Ćuk switch 24 and a second high frequency Ćuk diode 25. The high frequency Ćuk switch 17 and the high frequency Ćuk switch 24 are connected in series and such wise parallel to the series connection of the second high frequency Ćuk switch 24 and the second high frequency Ćuk diode 25, which are connected in parallel to the series connection of the Ćuk first inductor 12 and the Ćuk capacitor 13.

While one or more embodiments of the present invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention may cover further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST 1 electrical vehicle
2 PFC circuit
3 Ćuk converter
4 transformer
5 AC source
6 DC load
7 diode-based converter
8 high frequency PFC diode
9 PFC switch
10 PFC inductor
11 PFC capacitor
12 first Ćuk inductor
13 Ćuk capacitor
14 high frequency Ćuk diode
15 second Ćuk inductor
16 Ćuk output
17 high frequency Ćuk switch
18 phase inductor
19 trap conductor
20 trap inductor
21 phase capacitor
22 second high frequency PFC diode
23 second high frequency PFC switch
24 second high frequency Ćuk switch
25 second high frequency Ćuk diode

What is claimed is:

1. A three-phase alternating current (AC) to direct current (DC) power converter, comprising:
a boost power factor correction (PFC) circuit comprising:
a low frequency diode-based converter configured for connecting a PFC input of the low frequency diode-based converter to an AC source; and
a PFC inductor and a PFC capacitor connected in series together and in parallel to a PFC output of the converter;
the boost PFC circuit further comprising either:
a high frequency PFC diode and a high frequency PFC switch connected in parallel to the PFC output of the converter; or
a plurality of high frequency PFC switches, each high frequency PFC switch connected in parallel to one of the diodes of the low frequency diode-based converter;
a Ćuk converter comprising:
a first Ćuk inductor and a Ćuk capacitor connected in a first series connection;
a second Ćuk inductor and a high frequency Ćuk diode connected in parallel to the first series connection and forming, via a second series connection with the second Ćuk inductor, a Ćuk output that is configured to connect to a DC load; and a transformer comprising:
a primary side connected in parallel to the PFC capacitor; and
a secondary side connected in parallel to the Ćuk capacitor.

2. The converter according to claim 1, wherein the PFC capacitor, via the transformer, and the Ćuk capacitor are connected to the negative potential of the Ćuk output and the PFC inductor is connected, via the transformer, the first Ćuk inductor and the second Ćuk inductor, to the positive potential of the Ćuk output.

3. The converter according to claim 1, wherein an anode of the high frequency Ćuk diode is connected to the negative potential of the Ćuk output.

4. The converter according to claim 1, wherein the second Ćuk inductor is connected to the positive potential of the Ćuk output and in series with the first Ćuk inductor.

5. The converter according to claim 1, comprising a high frequency Ćuk switch connected in parallel to the high frequency Ćuk diode.

6. The converter according to claim 1, further comprising three phase inductors, each phase inductor is arranged in a respective current path between the PFC input and the low frequency diode-based converter.

7. The converter according to claim 1, further comprising a plurality of triplets of trap capacitors and respective trap inductors, the trap capacitors of each triplet of trap capacitors are connected together and each trap capacitor is connected in series with the respective trap inductor, wherein each trap capacitor is connected to a respective phase inductor and the low frequency diode-based converter.

8. The converter according to claim 6, further comprising three phase capacitors connected together and to a respective phase of the PFC input.

9. The converter according to claim 1, further comprising:
the high frequency PFC diode and the high frequency PFC switch connected in parallel to the PFC output of the converter; and
a second high frequency PFC diode and a second high frequency PFC switch connected in parallel,
wherein each high frequency PFC diode and the respective high frequency PFC switch are connected in parallel to the PFC output of the converter.

10. The converter according to claim 1, comprising:
the plurality of high frequency PFC switches, each high frequency PFC switch connected in parallel to one of the diodes of the converter; and a second high frequency PFC switch connected in parallel to the PFC inductor.

11. The converter according to claim 1, further comprising:
- the plurality of high frequency PFC switches, each high frequency PFC switch connected in parallel to a respective diode of the diodes of the low frequency diode-based converter;
- a high frequency Ćuk switch connected in parallel to the high frequency Ćuk diode;
- a second high frequency Ćuk switch and a second high frequency Ćuk diode connected in parallel to the second frequency Ćuk switch,
- wherein each high frequency Ćuk diode and the respective high frequency Ćuk switch are connected in parallel to the first series connection of the first Ćuk inductor and the Ćuk capacitor.

\* \* \* \* \*